US009417310B2

(12) United States Patent
Meloche et al.

(10) Patent No.: US 9,417,310 B2
(45) Date of Patent: *Aug. 16, 2016

(54) AIRPORT TARGET TRACKING SYSTEM

(71) Applicant: SEARIDGE TECHNOLOGIES INC., Nepean (CA)

(72) Inventors: Jean-Sebastien Meloche, Cumberland (CA); Alexander Sauriol, Ottawa (CA); Moodie Cheikh, Kanata (CA)

(73) Assignee: Searidge Technologies Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/571,732

(22) Filed: Dec. 16, 2014

(65) Prior Publication Data

US 2015/0131860 A1 May 14, 2015

Related U.S. Application Data

(63) Continuation of application No. 14/132,784, filed on Dec. 18, 2013, now Pat. No. 8,942,425, which is a continuation of application No. 12/671,450, filed as application No. PCT/CA2008/002104 on Dec. 1, 2008, now Pat. No. 8,737,684.

(60) Provisional application No. 60/991,423, filed on Nov. 30, 2007.

(51) Int. Cl.
*G06T 7/00* (2006.01)
*G01S 3/786* (2006.01)
(Continued)

(52) U.S. Cl.
CPC ........... *G01S 3/7864* (2013.01); *G06K 9/00771* (2013.01); *G06T 3/20* (2013.01);
(Continued)

(58) Field of Classification Search
CPC .................................................. G06K 9/00771
USPC ......................................................... 382/103
See application file for complete search history.

(56) References Cited

U.S. PATENT DOCUMENTS 5,374,932 A   12/1994   Wyschogrod et al.
5,563,988 A   10/1996   Maes et al.
(Continued)

FOREIGN PATENT DOCUMENTS

JP          11160424 B2     6/1999

OTHER PUBLICATIONS

Besada et al., "Image-Based Automatic Surveillance for Airport Surface", presented at the Fusion 2001 conference, Montreal, Canada, Aug. 7-10, 2001, 8 pages.
(Continued)

*Primary Examiner* — Jeffery Williams
(74) *Attorney, Agent, or Firm* — Jason R. Mueller-Neuhaus; Borden Ladner Gervais LLP

(57) ABSTRACT

A system for tracking objects using an intelligent Video processing system in the context of airport surface monitoring. The system addresses airport surface monitoring operational issues such as all weather conditions, high robustness, and low false report rate. The output can be used to complement existing airport surface monitoring systems. By combining the use of multi-sensors and an adverse weather optimized system, the system is capable of producing an improved stream of information for the target object over traditional computer vision based airport surface monitoring systems.

22 Claims, 11 Drawing Sheets

(51) Int. Cl.
  *G06T 7/20* (2006.01)
  *G08G 5/00* (2006.01)
  *G08G 5/06* (2006.01)
  *H04N 7/18* (2006.01)
  *G06K 9/00* (2006.01)
  *G06T 3/20* (2006.01)
  *G06T 3/60* (2006.01)

(52) U.S. Cl.
  CPC ............... *G06T 3/60* (2013.01); *G06T 7/0024* (2013.01); *G06T 7/0044* (2013.01); *G06T 7/2053* (2013.01); *G06T 7/2093* (2013.01); *G08G 5/0013* (2013.01); *G08G 5/0082* (2013.01); *G08G 5/06* (2013.01); *G08G 5/065* (2013.01); *H04N 7/181* (2013.01); *G06T 2207/10016* (2013.01); *G06T 2207/20208* (2013.01); *G06T 2207/30232* (2013.01); *G06T 2207/30236* (2013.01); *G06T 2215/12* (2013.01)

(56) References Cited

U.S. PATENT DOCUMENTS

| | | | | |
|---|---|---|---|---|
| 5,847,755 | A * | 12/1998 | Wixson et al. | 348/149 |
| 5,889,878 | A * | 3/1999 | Togashi | 382/103 |
| 5,892,855 | A | 4/1999 | Kakinami et al. | |
| 6,081,606 | A | 6/2000 | Hansen et al. | |
| 6,445,409 | B1 * | 9/2002 | Ito et al. | 348/155 |
| 7,643,066 | B2 | 1/2010 | Henninger, III et al. | |
| 7,783,118 | B2 * | 8/2010 | Zhou | 382/236 |
| 8,446,468 | B1 * | 5/2013 | Medioni et al. | 348/144 |
| 2003/0194131 | A1 * | 10/2003 | Zhao et al. | 382/190 |
| 2004/0225432 | A1 * | 11/2004 | Pilley et al. | 701/117 |
| 2005/0031204 | A1 * | 2/2005 | Kaneko et al. | 382/190 |
| 2006/0203098 | A1 * | 9/2006 | Henninger et al. | 348/211.99 |
| 2009/0060278 | A1 * | 3/2009 | Hassan-Shafique et al. | 382/103 |
| 2009/0219391 | A1 * | 9/2009 | McLeish et al. | 348/143 |

OTHER PUBLICATIONS

Thirde et al., "Distributed Multi-Camera Surveillance for Aircraft Servicing Operations", Advances in Visual Computing Lecture Notes in Computer Science; LNCS, Jan. 1, 2005, pp. 118-125.

Marcenaro et al., "Image stabilization algorithms for video-surveillance applications", Proceedings 2001 International Conference on Image Processing, IPIP, Oct. 7-10, 2001, vol. 1, pp. 349-352.

Besada et al., "Airport surface surveillance based on video images", IEEE Transactions on Aeropsace and Electronic Systems, vol. 41, No. 3, Jul. 1, 2005, pp. 1075-1082.

European Patent Application No. 08854752.6, Search Report dated Dec. 27, 2011.

International Patent Application No. PCT/CA2008/002104, International Search Report dated Mar. 16, 2009.

"Surveillance and Conflict (Runway Incursion) Detection and Alerting",Guidelines for Electronic Terrain, Obstacle and Aerodrome Mapping Information, ICAO publication No. 9881, Appendix A.2.4, Nov. 29, 2007, pp. A-13 to A-17.

European Patent Application No. 08854752.6, Office Action dated Sep. 29, 2014.

Stauffer et al., "Learning Patterns of Activity", IEEE Transactions on Pattern Analysis and Machine Intelligence, vol. 22, No. 8, Aug. 2000, pp. 747-757.

Pavlidou et al., "IST Intervuse Project: Integrated Radar, Flight Plan and Digital Video Data Fusion for A-SMGCS", conference paper and was published as early as 2005, 6 pages.

Canadian Patent Application No. 2,707,104, Office Action dated Apr. 25, 2016.

* cited by examiner

AIRPORT TARGET TRACKING SYSTEM

CROSS REFERENCE TO RELATED APPLICATIONS

This application is a continuation of U.S. patent application Ser. No. 14/132,784, filed Dec. 18, 2013, which is a continuation of U.S. patent application Ser. No. 12/671,450, filed Jan. 29, 2010, which is a national phase entry of International Patent Application No. PCT/CA2008/002104, filed Dec. 1, 2008, which claims the benefit of priority of U.S. Provisional Patent Application No. 60/991,423, filed Nov. 30, 2007, which are incorporated herein by reference in their entirety.

FIELD OF THE INVENTION

The present invention relates to detection and tracking of targets for air traffic management in an airport.

BACKGROUND OF THE INVENTION

Airports and Air Navigation Services (ANS) providers use surface movement management systems in order to facilitate the safe and expeditious flow of traffic in and around an airport. As should be appreciated by persons skilled in the art, airport traffic includes aircraft, support vehicles such as luggage trolleys, fuel tankers, and passenger busses for example. These systems provide users with real-time situational awareness of traffic throughout the airfield, which includes ground traffic and air traffic proximate to the airfield and structures in and around the airfield. There are two primary classes of known management systems used for air traffic control. A first class includes cooperative systems in which the system relies on the target to report its status, and ultimately its location. A second class includes non-cooperative systems which do not rely on any information provided by the target. Examples of a cooperative system include multilateration (MLAT) and ADS-B, a GPS based system, while examples of a non-cooperative system include surface radar and video based systems.

While surface radar and MLAT systems address a significant component of the ground control requirements, neither system alone provides a comprehensive solution as limitations exist with each system. In the case of surface radar, blind spots, multipathing, antenna period, and clutter tend to affect the usability of the system. In the case of MLAT, any targets not in possession of an active transponder will not be detected or tracked by the system. This is especially problematic for aircraft which turn off their transponders after landing, which renders them invisible to the MLAT system. Furthermore, most vehicles do not have transponders. Accordingly, the information presented to the air traffic personnel can be incomplete or inaccurate, thereby leading to potential safety issues since a properly tracked vehicle or aircraft could be directed to an area where an undetected aircraft may be residing.

The use of complimentary video-based systems for improving the precision of specific airfield areas in order to provide a real time view of these coverage gaps has been proposed. These systems are intended to provide the controller a full, comprehensive picture of the entire airfield surface, thus enhancing the reliability and precision of the overall surface movement management systems.

Video-based airport surface detection systems can also provide real time positional information for airport surface control. Exemplary video-based systems are disclosed in Japanese patent application number JP11160424 and in the paper "Image-Based Automatic Surveillance for Airport Surface" by Besada at al. presented at the FUSION 2001 conference in Montreal, Canada. However since these systems rely on visual input from camera sensors, they can be affected by various conditions such as, but not limited to, low visibility, sensor movement introduced by wind, and low light. In addition to weather, other external factors can affect the quality of the produced data. These factors include, but are not limited to, lens partial and full obstruction and sensor failure. Such known systems cannot compensate for these problems, and are thus not fully reliable. Further, video systems do not integrate well with conventional surface movement management systems, which display information to the user in a radar-track format.

It is, therefore, desirable to provide a system for improving the performance and reliability of an intelligent video processing system.

SUMMARY OF THE INVENTION

It is an object of the present invention to obviate or mitigate at least one disadvantage of previous video based airport surface monitoring systems. The improvement on all weather operation is a set of at least one stabilization algorithm that can self-adapt to environmental condition changes (visual weather, wind, light) and/or can have the capability of using camera sensor hardware that is minimally impacted by visual conditions caused by inclement weather.

The improvement of robustness can be addressed by using multiple sensors observing the airport surface from different point of view. A correlation between the sensors can be made to identify a false report, set a confidence level of the report, and filter invalid targets thus producing a high quality output. The multi-sensor capability also provides a highly robust redundant design.

The presently described embodiments of the invention can be optimized to leverage airport specific feature such as a flat surface to improve the precision of positioning and output a complete geodetic (latitude, longitude, elevation) set information as well as additional information such as unique identifier, speed, heading, shape and size of detected object in the sensors field of view.

The presently described embodiments of the invention are directed to an Intelligent video based Detection and Positioning Processing System, comprising at least one video camera to provide a real-time view of a given area. The video image data captured by the cameras is then processed using a sophisticated set of algorithms in order to obtain specific information such as:

a) detection of new objects in a scene (aircraft, vehicles, animals)
b) the range (location) of the detected object(s) in the world.
c) specific attributes of the detected objects (shape, composition, colors, speed, heading)

Cameras can be deployed around an airfield to provide effective distributed radar-like coverage of any area where a camera can be directed at. Both day/night video and passive thermographic cameras are used for continuous monitoring in all weather and low visibility conditions.

The display seamlessly integrates real-time video along with target information. Target information can be fused with other data sources such as ADS-B, Radar, MLAT and other ASTERIX compliant systems. Since the output of the system is in a radar-track format, it is more readily integrated into existing surface monitoring systems.

In a first aspect, there is provided an airport surface surveillance system. The system includes an Image acquisition system, a target identification system, and a display system. The image acquisition system captured frames of digital images of an area of the airport surface mapped to a predetermined coordinate system, and executes a stabilization algorithm to provide corresponding frames of stabilized images. The target identification system executes a target identification algorithm for identifying pixels in the frames of stabilized images which correspond to a target. The target identification system calculates a position of the target on the airport surface based on the Identified pixels. The display system receives the position of the target and generates a two-dimensional plan view of the airport surface with an Icon representing the position of the target on a visual display. In one embodiment, the image acquisition system includes a camera array including at least one camera for capturing the frames of digital images, and an acquisition array for executing the stabilization algorithm upon the frames of digital images to provide the corresponding frames of stabilized images. In this embodiment, the acquisition array statistically compares a new image with a previous image to generate at least one stabilized image corresponding to the new image. The acquisition array generates a first histogram corresponding to the new image and a second histogram corresponding to the previous image. The acquisition array compares the first histogram to the second histogram for determining one or more of a translation or rotation of the new image relative to the previous image. The at least one stabilized image can be translated, rotated, or rotated and translated relative to the new image.

In another embodiment of the present aspect, the target identification system includes an object processor for executing the target identification algorithm that identifies background pixels of the frames of digital images and moving pixels of the frames of digital images corresponding to the target. In this particular embodiment, the object processor determines the position of the moving pixels by projecting a virtual ray from a virtual sensor corresponding to known coordinates of the at least one camera through a central portion of the moving pixels, the Intersection of the virtual ray with the airport surface being calculated as the position of the moving pixels in the predetermined coordinate system. The at least one camera is a first camera, and the camera array can include a second camera. The object processor is a first object processor connected to the first camera and the target identification system can include a second object processor connected to the second camera. In such an embodiment, the first camera and the second camera capture images from substantially a same area of the airport surface. The first object processor calculates a first position of the target and the second object processor calculates a second position of the target. The target identification system can further include a merging processor for determining a final position based on a combination of the first position and the second position.

In yet another embodiment of the present aspect, the object processor converts the position into WGS84 format and provides ASTERIX formatted data including the WGS84 format position. The display system receives the ASTERIX formatted data and displays the icon at a location on the two-dimensional plan view of the airport surface corresponding to the position. Optionally, the display system provides real-time video output to the visual display, and can include an enhanced image display module for graphically outlining the moving pixels corresponding to the target on the real-time video output appearing on the visual display.

In a second aspect, there is provided a method for tracking a target on an airport surface mapped to a predetermined coordinate system. The method includes capturing raw images of the airport surface using at least one camera; pre-processing the raw images to correct at least one of translational and rotational deviations relative to a previous image for providing stabilized images; processing the stabilized images to identify pixels corresponding to the target from background pixels of the stabilized images; calculating a position of the target on the airport surface; and, displaying an icon representing the position of the target on a two-dimensional layout of the airport surface on a visual display. Optionally, real-time video from the stabilized images can be provided on the visual display, and a graphical outline of the pixels corresponding to the target on the real-time video can be provided on the visual display.

According to an embodiment of the second aspect, pre-processing can include generating a first histogram corresponding to a current raw image, generating a second histogram corresponding to a previous stabilized image, comparing the first histogram to the second histogram for determining at least one of the translational and rotational deviations of the current raw image relative to the previous stabilized image, and performing at least one of translating and rotating of the current raw image by an amount to correct the deviations for providing a stabilized image. In another embodiment, processing includes identifying the background pixels of the stabilized images through adaptive background detection to isolate moving object pixels, and Identifying the moving object pixels as pixels corresponding to the target. Identifying the background can include comparing a reference background to a movement threshold, determining if the moving object pixels are moving in substantially the same way at substantially the same time, and, updating the reference background to include the moving object pixels when the moving object pixels are rejected for failing to move in substantially the same way at substantially the same time.

In the presently described embodiment, identifying the background further includes extracting shadow pixels corresponding to a shadow of the moving object pixels in response to a shadow threshold, and updating the reference background to include the shadow pixels. Identifying the background can also include determining if the area of the moving object pixels is at least a predetermined minimal size, and updating the reference background to include the moving object pixels if the area of the moving object pixels is less than the predetermined minimal size. Identifying the moving object pixels includes assigning a unique identifier number to the moving object pixels if the moving object pixels fail to correlate with a previously detected object from a previous stabilized image, and updating previously stored features of the previously detected object with features of the moving object pixels. These features can include any one of age, shape, size and position of the moving object pixels. Alternately, identifying the moving object pixels can include categorizing the moving object pixels as a target when the age of moving object pixels exceeds a predetermined age threshold, and discriminating the target from at least one other previously identified target when the moving object pixels merge or spilt from pixels corresponding to the at least one previously identified target.

According to yet another embodiment of the present aspect, calculating includes computing a virtual position of the at least one camera in a geodetic reference frame, calculating a vector corresponding to a virtual ray extending from the virtual position through the pixels corresponding to the target in each of the stabilized images, and, computing an intersection of the virtual ray with the airport surface to determine the position of the target. Calculating can include converting the position of the target into one of WGS84 and Universal Trans-Mercator (UTM) formats, and providing multiple positions of the target on the airport surface by corresponding multiple cameras. With multiple cameras, the method further includes: determining if the rays projected from each of the multiple cameras substantially intersect with each other; rejecting the positions corresponding to each of the multiple cameras which have rays that fail to substantially intersect; and combining the positions corresponding to each of the multiple cameras which have rays that substantially intersect for providing a final position. According to the present embodiments, combining includes selecting one of the positions as the final position based on a predetermined weighting criteria, or averaging the positions to arrive at the final position.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present embodiments present an intelligent video processing system used in the context of surface monitoring. The system uses visual sensors, such as commercially available video cameras for example. The system compensates for operational issues such as non-ideal environmental conditions, which include poor weather, in order to provide high robustness and a low false report rate. The output can be used to complement existing surface monitoring systems, and by combining the use of multiple sensors, a reliable stream of information for the target object over traditional surface monitoring systems is provided.

The embodiments of the present invention are directed to an airport environment and addresses the hazard issues involved in visual observation of airport surfaces, which include non-ideal weather conditions and erroneous reports of detection. It should be understood that any airport surface, or special areas such as aprons, can be monitored.

The intelligent video processing system embodiment of the present invention can employ one or a plurality of visual sensors and computers to generate a high precision Radar-like geodetic output describing real-time traffic on a monitored airport surface in all weather conditions. The system can output at a high update rate with a low latency, while outputting a high precision position expressed in world geodetic coordinates. High positional accuracy in inclement weather conditions is achieved through the adaptability of a stabilization algorithm and the capacity to process visual input from alternative visual sensors that are less affected by inclement weather conditions than visual spectrum sensors. Examples of sensors can include traditional visual cameras, thermographic and non-visible spectrum cameras. Because multiple sensors can be directed at substantially the same area, the system can correlate the Information from the multiple sensors, thus providing more accurate positioning information that would otherwise be obtainable using a single sensor. In addition to providing radar-like geodetic output, a real-time annotated video output can also be provided to an operator to enhance monitoring of the airport surface.

Figure 1A:
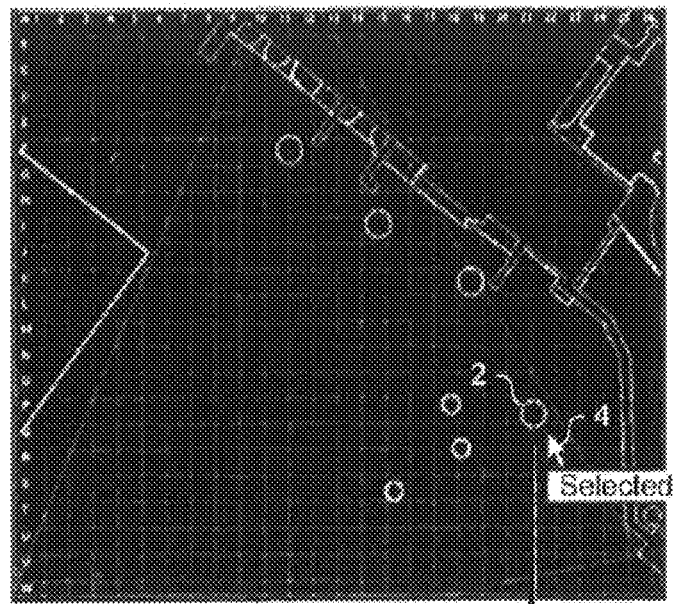
FIG. 1A and FIG. 1B are sample images showing graphical information generated by an intelligent video processing system, according to an embodiment of the present invention.
Figure 1B:

FIG. 1A and FIG. 1B are sample images showing graphical information generated by the intelligent video processing system, according to an embodiment of the present invention. The sensors of the system digitally capture images of a selected surface area to be monitored. The algorithms executed by one or more computers receive the raw images and executes image processing operations in order to determine the presence of a target. These image processing operations include corrective algorithms to compensate for camera movement and/or noise contributed by unwanted artifacts. FIG. 1A shows a computer generated plan view rendering of the airport surface area being monitored by one or more sensors. Once the algorithms have properly identified a target, in this present example being an aircraft approaching a gate, the real-time graphical rendering of FIG. 1A displays an icon 2 representing the aircraft. As the aircraft moves, the system tracks its movement and updates the position of icon 2 on the graphical rendering.

The system provides the capability for real-time video viewing the surface area, and in particular, of the aircraft in the real-time video corresponding to icon 2. Using a cursor 4, the user can select icon 2 in the graphical rendering of FIG. 1A. If available, additional text information corresponding to icon 2 can be displayed as cursor 4 comes into contact with icon 2. This information can include flight number, type of object etc. Once selected, the real-time video image of FIG. 1B is updated to include an annotation box 6 outlining the corresponding aircraft. As will be described later, an target identification algorithm executed by the computer upon the raw image data provided by the sensor(s), will accurately identify the aircraft shown in the video image of FIG. 1B. Therefore, if the target identification algorithm identifies multiple objects, such as moving vehicles, then additional icons will appear in FIG. 1A, each being selectable for visual identification in FIG. 1B with corresponding annotation boxes.

Figure 2:
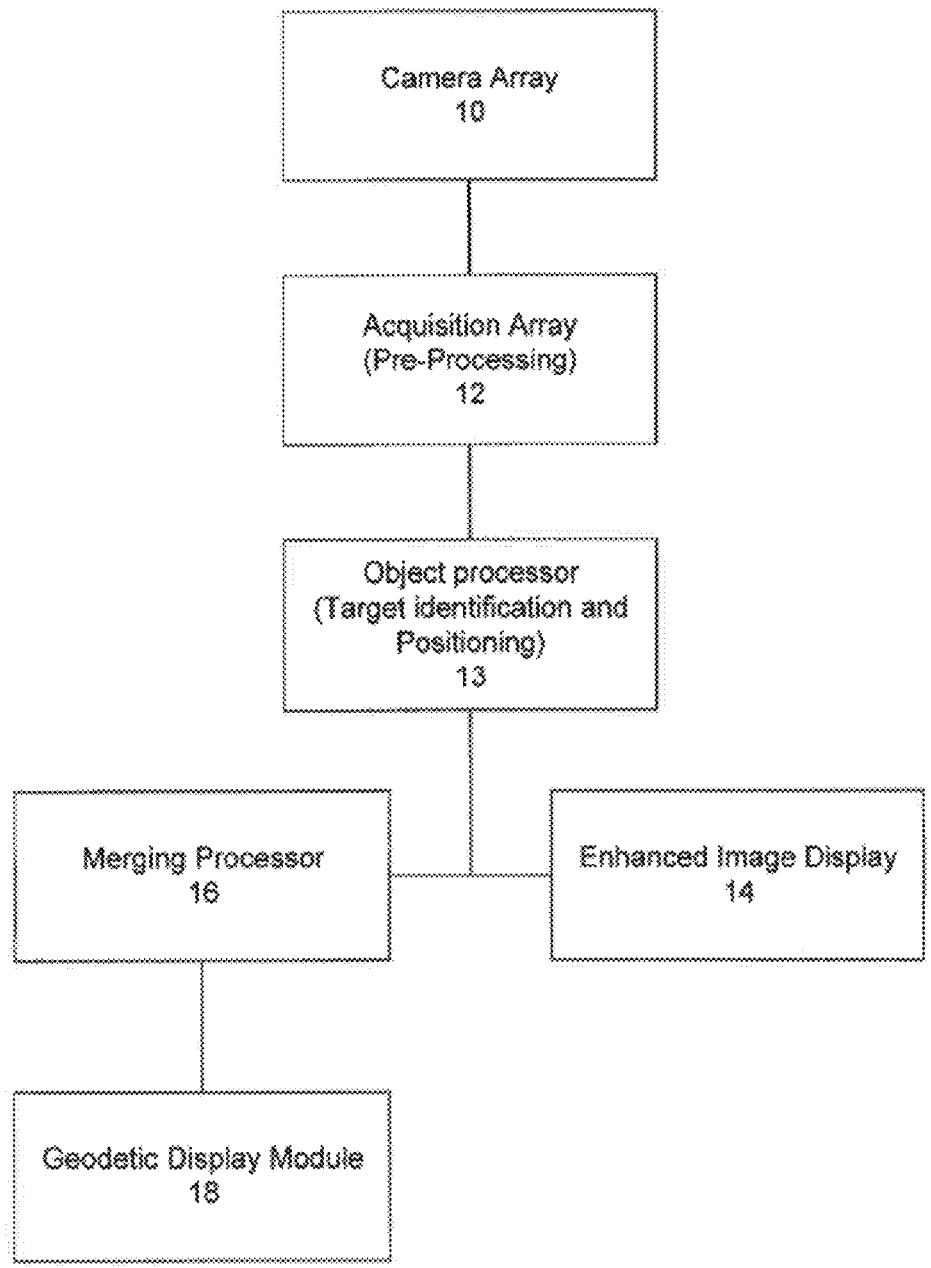
FIG. 2 is a block diagram illustrating functional blocks of the intelligent video processing system, according to an embodiment of the present invention.

FIG. 2 is a block diagram illustrating functional components of the intelligent video processing system according to an embodiment of the present invention. The system, at a conceptual level, includes a camera array 10, an acquisition array 12, an object processor module 13, an optional enhanced image display module 14, a merging processor module 16, and a radar-track geodetic output display module 18. The system can be further generalized to include three main components. The first component is the image acquisition system that includes camera array 10 and the acquisition array 12. The Image acquisition system captures frames of raw image data and executes pre-processing algorithms for providing stabilized image data. The second component is a target identification system that includes the object processor 13 and the merging processor module 16. The target identification system is responsible for executing algorithms for identifying a target, and more specifically the pixels corresponding to the target, from the stabilized image data and for calculating its position relative to a predetermined coordinate system. The third component is a display system that includes the optional enhanced image display module 14 and the display module 18. The display system is responsible for displaying the target for the user based on one or more different formats, with or without additional graphical annotations.

The system uses a raw video input from a camera array 10 which can be comprised of a variety of visual sensors such as visible spectrum (color or monochrome) and thermographic cameras to optimize the quality of the information that will be provided to acquisition array 12. It will be appreciated by those of skill in the art that the selection of different visual sensors will involve trade-offs between resolution and other desirable capabilities. For example, while thermographic cameras can provide all weather visual input, the current technology available cannot produce a high resolution image. While visible spectrum camera can be affected by low visibility weather phenomenon such as snow, blizzard and fog, in most case they will produce a higher quality image than thermographic sensors. The system. Is capable of using both type of sensors to abstract visually induced errors and improve performance. Accordingly, those of skill in the art will appreciate that camera array 10 can be advantageously constructed using a mix of visual sensors in order to obtain a desired combination of image resolution and robustness to adverse conditions such as weather.

In some embodiments of the invention, the visual sensors of camera array 10 can be set up in pairs, in order to provide stereographic imaging capabilities, and to improve both the redundancy and positional accuracy of the system. Hence, different areas of an airport surface can be covered by more than one visual sensor. For example, an airport taxiway may be covered by a pair of thermographic cameras mounted on a control tower, a pair of high-resolution video cameras mounted on the control tower, and an additional pair of high-resolution video cameras mounted on another airport building remote from the control tower. While pairings of the same type of sensors is discussed, a mix of diverse visual sensor types can be paired together to provide weather-Insensitive information flow to the system. Those of skin in the art will appreciate that by providing a number of vantage points and camera types covering the same area, redundancy and improved accuracy is provided. A reduction of clutter and hot-spot zones in the overall coverage of the system can be achieved by locating a plurality visual sensors remotely from one another such that if the field of view of one sensor are blocked by objects, another sensor may be able to perceive the blocked area. It will be appreciated that the overall number of sensors used in any embodiment of the present invention will depend on the degree to which each of these objectives is emphasized in any given deployment.

Each camera module in camera array 10 provides the system with a video input. Acquisition array 12 detects objects in the video, and computes the position of each object on the surface of the airport. In the present embodiments, the acquisition array 12 includes one or more computers that perform both a pre-processing/stabilization process (illustrated in FIG. 3 and described below) and a processing/target detection process (illustrated in FIG. 4A and described below). At this stage, the information produced by acquisition array 12, referred to as stabilized image data, is used by object processor 13 to determine or extract pixels corresponding to a moving target from background elements. The object processor 13 can then calculate a surface position of the target in the image. According to an example embodiment, object processor 13 provides data "messages" in the well known ASTERIX format or protocol, where each data message provides a report of the characteristics of a target, which includes its position in WGS84 format. An intermediate-stage information product referred to as enhanced image data, is provided by enhanced image display module 14. The enhanced image data includes video output from individual members of camera array 10 having information overlaid on the video signal such as the annotation box 6 shown in FIG. 1B for visually identifying targets, or any other information (e.g. target velocity) that can be extracted from the images analyzed by acquisition array 12, as will be apparent to those of skill in the art. The enhanced image display module 14 can receive manually input information regarding the identified target, which includes for example airline and flight number of an identified aircraft. In embodiments where the camera array 10 comprises a plurality of visual sensors located remotely from one another that are directed to the same area of Interest, a merging processor module 16 can correlate the Information flowing from each visual sensor in order to produce high performance positional accuracy. Using the output of the merging processing module 16, the system generates one or both of a 2D radar-track geodetic output and a real-time video image from geodetic display module 18. Geodetic display module 18 can be configured to convert the WGS84 position to a Universal Trans-Mercator (UTM) format.

In order to facilitate integration with existing airport surface monitoring system that includes MLAT and surface radars, the object processor 13 can provide the ASTERIX format data to supplement the monitoring functionality of these existing systems. For example, positional data of targets located in areas that cannot be detected by MLAT and surface radars can be provided for display to users.

All the processes described above are implemented as code executable by one or more computers of the system. The algorithms describing the functionality of these processes are now described.

Figure 3:
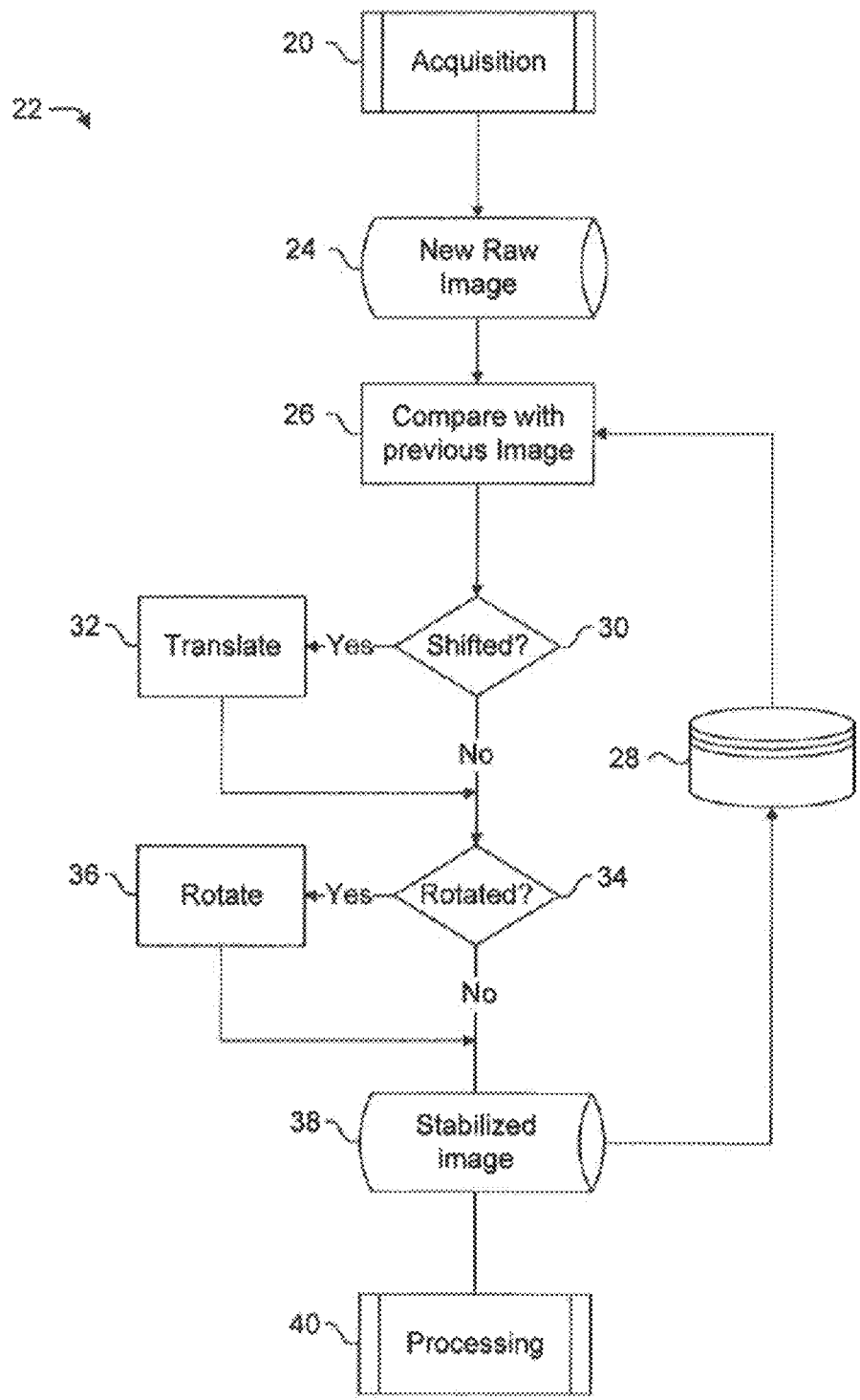
FIG. 3 is a process flow diagram illustrating a pre-processing stabilization method according to an embodiment of the present invention.

FIG. 3 is a process flow diagram illustrating a pre-processing stabilization method executed for the output of each sensor, according to an embodiment of the present invention. This pre-processing stabilization method is a sub-routine executed by Acquisition array 12 of FIG. 2. In general, the process of FIG. 3 corrects or compensates for camera jitter or vibration. More specifically, the process filters video input of the airport surface surveillance cameras with a stabilization algorithm for correcting sharp changes between frames of the video that could result from external factors such as wind or other sources of vibration shaking the camera. Raw input is acquired from each member of the camera array and processed to generate a statistical analysis of the Image characteristics. The histogram of the image is then compared with previously analyzed frame. An algorithm is applied to match histograms. The main motion vector can then be derived to translate or rotate the Image and obtain a stabilized picture. Through this step, embodiments of the present invention can void local motion of the sensor that could impact the precision of the positional accuracy of the invention.

The image correction processing process 22 includes the following steps. An acquisition step 20 generates a new raw image 24, which is compared at step 26 with a previously processed image stored in memory, such as random access memory. It is noted that due to the speed of the comparison, a suitable type of memory 28 with high speed write capability should be used. Previously processed images can be stored in a mass storage medium or other non-volatile memory, such as a hard disk drive when the system is shut down. Upon startup of the system, the previously processed image stored in the non-volatile memory is loaded into the random access memory for regular operation. This previously processed image can be the last most recently processed image or frame for example. This comparison can be carried out in a number of different ways, and depends on the intrinsic rotation and translation invariant characteristics of image histograms, as is well known in the art of image analysis. The result of the comparison performed at step 26 allows the process to make two determinations, that being if the current image is rotated or translated relative to the previously stored image. This rotation and or translation can be due to vibration of the sensor due to weather or other environmental effects. At step 30 the process determines whether the raw image of step 24 has been shifted or translated, and if so, the approximate magnitude and the direction of the shift. The process corrects this error by applying a compensatory translation at step 32. Regardless of whether there has been a correction for translation/shifting at steps 30-32, at step 34 the process determines whether the raw image of step 24 has been rotated, and if so, the approximate magnitude and the direction of the rotation. The process corrects this error by applying a compensatory rotation at step 36. The result of the process is a stabilized image 38. A copy of the stabilized image is stored in a bank of previously processed images 28 in order to permit future stabilization, and then output for further processing at step 40.

In an alternative embodiment of the present invention, a configurable mask can be used for digitally removing an area of non-interest. In particular, certain parts of an Image in the frame may not be of interest and could impact the accuracy/relevancy of detection. The application of the masking feature can be performed at the software-level, and can be stabilized either along with the image which it is masking or Independently from it, depending on the purpose of the mask. For example, if the purpose of the mask is to remove all visual inputs above the horizon, it may be advantageous to stabilize the masking function concurrently with the Image data since the movement of the sensor relative to the airport surface and the masked elements of the Image will be relatively equal. However, where the masking is intended to remove objects that may also be affected by the forces that are destabilizing the image data, then additional steps can be taken in applying the masking feature, as will be appreciated by those of skill in the art.

Figure 4A:
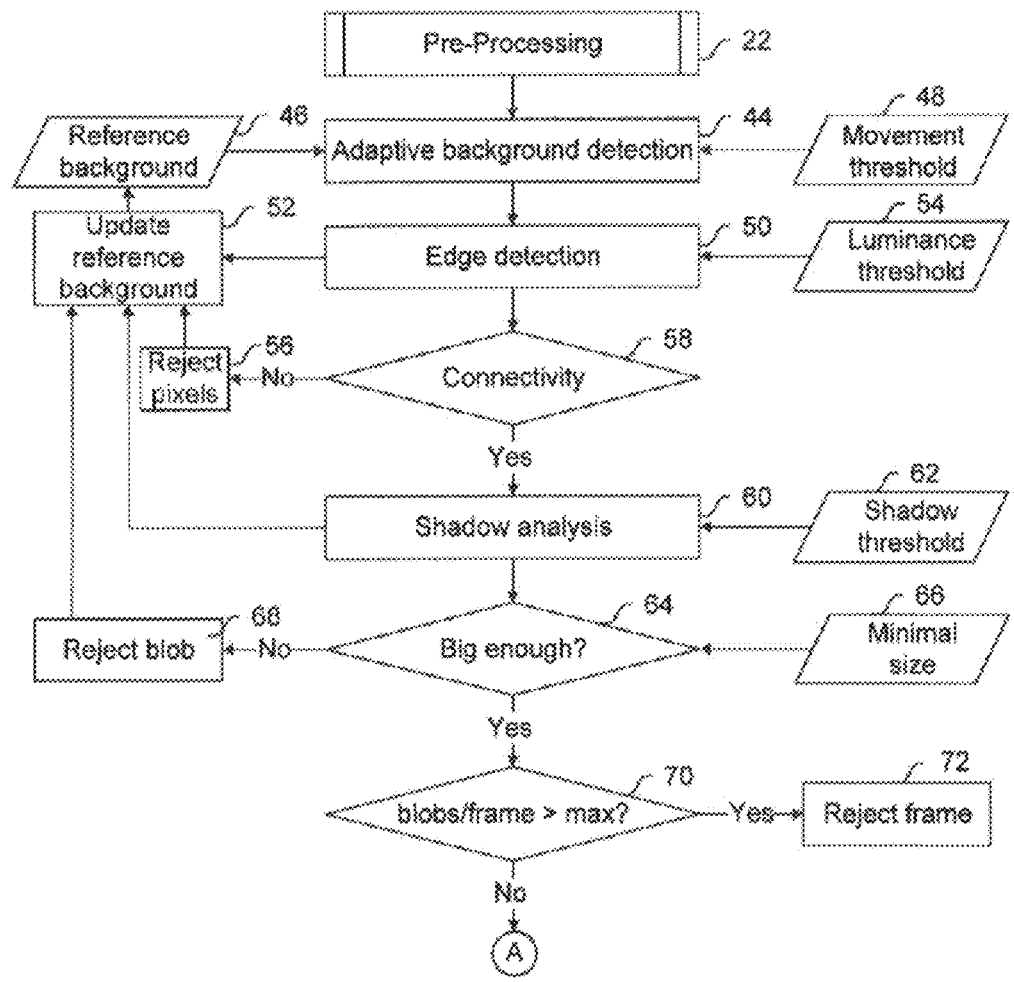
FIGS. 4A and 4B is a process flow diagram illustrating a target detection method according to an embodiment of the present invention.
Figure 4B:
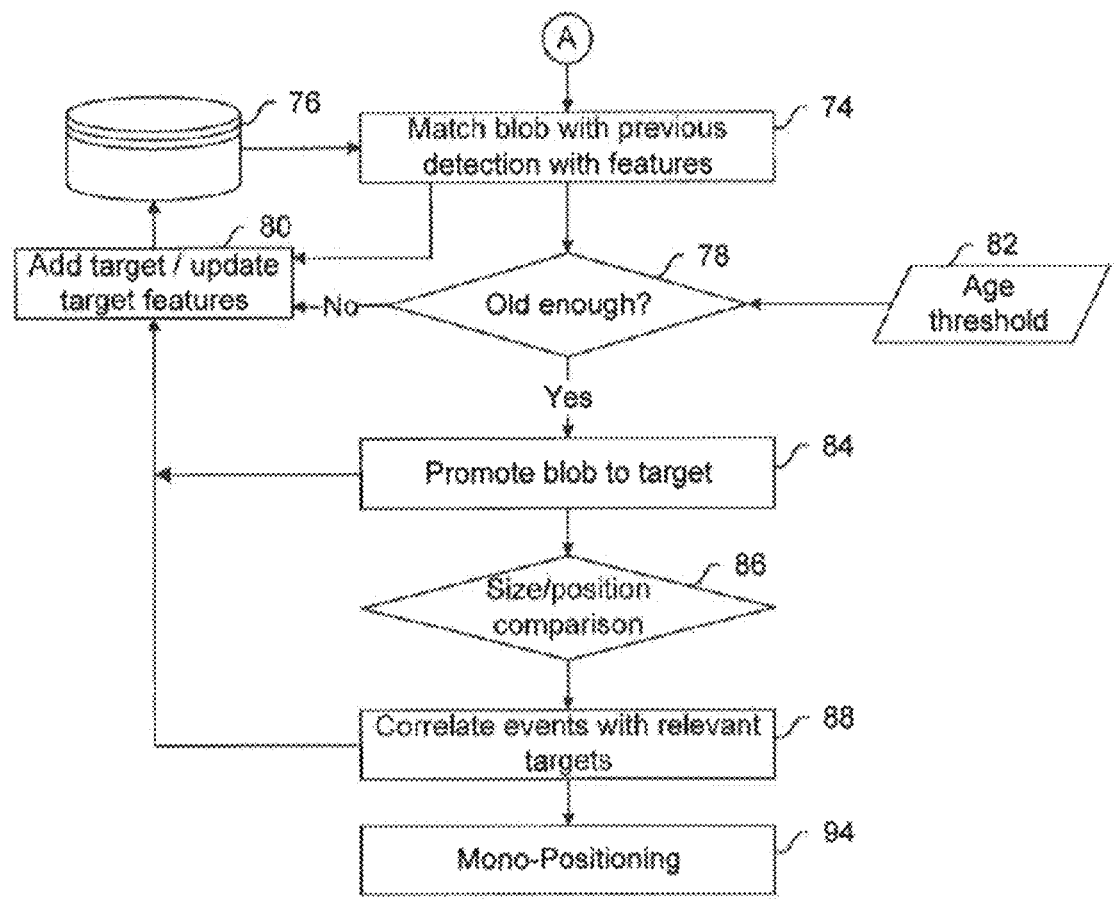

FIGS. 4A and 4B are process flow diagrams illustrating a target detection method according to an embodiment of the present invention. It is assumed that the present target detection process starts after the image correction process 22 of FIG. 3 has provided output stabilized images. This target detection method is a sub-routine executed by object processor 13 of FIG. 2. FIG. 4A outlines the steps used for identifying an object from a background, while FIG. 4B outlines the steps used for identifying a target from an object. In FIG. 4A, the stabilized images form a sequence of images that allows the system to perform an adaptive background detection at step 44 on the sequence of images such that, having regard to a reference background 46 known to exist in the airport area under surveillance by a given video sensor, non-moving objects are differentiated from moving objects. Furthermore, objects that have not previously moved can be differentiated from those objects which have previously moved.

Those of skill in the art will appreciate that there are methods of adaptive background detection which are known, such as the one described in the IEEE paper "Learning Patterns of Activity Using Real-Time Tracking", published in *IEEE Transactions on Pattern Analysis and Machine Intelligence*, vol. 22, no. 8, (August 2000) at pp. 747-757. It will also be appreciated that the various methods of adaptive background detection (and, implicitly, subtraction) known in the art each have advantages and disadvantages, and that the selection of a particular method of adaptive background detection will imbue a given deployment of the present invention with some of those advantages and disadvantages. Accordingly, in some embodiments of the invention, those methods of adaptive background detection that minimize the presence of ghosts, or that allow the system to consider objects that have previously moved but since ceased moving as non-background objects, can enhance the reliability of the system, particularly in environments where targets may remain motionless for longer periods of time (e.g. In less busy airports, for example.).

One example method of performing adaptive background detection involves statistically analyzing each sequentially received stabilized image using an adaptive background subtraction methodology. Each pixel of each image is analyzed by observing its intensity value over time. The "moving" pixels will tend to have a higher intensity transition rate than "stationary" pixels. Those skilled in the art should understand that a "moving" pixel is actually a fixed pixel of the image that changes intensity value as the object passes by it. Accordingly, a "stationary" pixel is a fixed pixel where the object does not pass by it. Further analysis of the transition rate of the pixels over time can abstract movement from weather or lighting induced errors. As will be appreciated by those of skill in the art, algorithms can be employed which dynamically self correct the Internal thresholds range values for intensity change (luminance, color) to auto-correct for weather and lighting condition changes. For example, daytime lighting conditions produce different patterns and rates of intensity change than nighttime lighting conditions, since airports tend to be brightly illuminated. Weather may also affect pixel intensity values, such as by changing the color or Intensity of pixels intermittently. Hence, the current reference background 46 can be used as a baseline such that application of the movement threshold 48 to the image yields an accurate determination between a moving object and an object that forms part of the background.

Accordingly, a movement threshold 48 can be applied based on the background detection technique being employed. For example, the movement threshold can be a specific change in pixel intensity value over time, for one set of light specific conditions. Those skilled in the art will understand that movement thresholds based on parameters corresponding to the technique being employed will be used. An optional edge detection step 50 can further refine the degree to which the system can differentiate between true background objects and false background objects by applying an edge detection algorithm based on a luminance threshold 54 specified by the system. In the present context, a luminance threshold is associated with the Intensity of a pixel, where higher precision detection of edges is obtained using a high luminance threshold, when such edges are not intense or "fuzzy". Conversely, lower precision detection of edges is obtained using a low luminance threshold, when such edges are sharp and well defined. To the extent that objects that were previously thought to make up part of the background may begin moving, or vice versa, they may be respectively added to or removed from reference background 46 in an update reference background step 52. This updated reference background can then be used for processing of subsequent images.

At step 58, pixels identified as moving are processed for connectivity in order to identify areas of movement, thus further refining the distinction between background and foreground. This connectivity detection can be achieved in any number of known ways, such as the well-known expanding areas algorithm, algorithms for determining the convex hull of a set of points, or any other known means for determining that a plurality of contiguous pixels are moving in substantially the same way at substantially the same time. If a given set of pixels falls the connectivity testing at step 58, then those pixels will be rejected at step 56, end the update reference background process 52 can be performed in order to at least temporarily include those pixels in the reference background. Next, at step 60, the intensity of contiguous groups of pixels identified at step 58 is inspected to identify and extract unwanted areas such as shadows, according to a shadow threshold 62 specified by the system according to the prevailing weather conditions, time of day, and, in some embodiments of the present invention, known patterns of illumination for the airport area under surveillance. The output of the shadow analysis is also fed to the update reference background step 52 to further refine the definition of the reference background.

Once the connectivity testing is performed at step 58 and shadows have been removed at step 60, the process has reached a point where the information being processed is referred to as a "blob", which may be defined as a contiguous plurality of pixels identified as an area of movement in the image foreground. It should be noted that the blob is not yet categorized as a valid moving object. Blobs are filtered by size (area) at step 64 based on a minimal size threshold 66 specified by the system. This eliminates the possibility of invalid target detection caused by compression artifacts, minute movements, objects that are too small, objects that are too far away from the sensors to be relevant to the area under surveillance, or any other source of blobs known in the art that is capable of generating blobs that the system is capable of recognizing, but which are not of interest to the air traffic controllers who rely on the information generated by the airport surface monitoring system of the present invention. If the blob is below the minimum size threshold, it is rejected at step 68, and the pixels corresponding to this blob is sent to the background update step 52 to include these pixels as part of the reference background.

At step 70, the system determines whether a maximum number of blobs threshold is exceeded, and the process terminates (for that frame) at step 72 by eliminating the frame if it has too many blobs, since it is assumed to include too much noise or Interference. For example, a sudden shift or vibration of the camera may result in the spontaneous appearance of a high number of blobs for several frames. Alternatively, the number of current blobs may be too high. In either situation, the affected frames are discarded. It will be appreciated that the maximum number of blobs per frame will be a parameter that can be fine-tuned depending on the position of the sensor that is generating the raw image data, the location of the airport area under surveillance, or any other factor that may influence the noise threshold at which it is more likely than not that a given frame will introduce more confusion into the system than useful information.

Continuing with FIG. 4B at step 74, blobs are compared with previously detected blobs and target features stored by the system in storage means 76 based on the analysis of previously processed frames. A correlation is made at step 74 based on the shape, size and position of the previously detected blobs and target features in storage means 76 to find a corresponding detection in previous frames. If a correspondence cannot be found, the blob is assigned a unique ID so it can be referenced in the future, and the previously detected blobs and target features data 76 is updated at step 80 to add the new target and/or update target features to permit possible future correlation in a later iteration of step 74. If the correspondence can be made at step 74, the process updates the information stored at 76 about previously detected blobs and target features. Blobs are then filtered by their age at step 78 according to an age threshold 82 specified by the system. The age of the blob can be defined as the number of continuous frames in which it has been detected, or it can be based on an actual computation of the number of seconds that have elapsed since it was detected, or any other means of differentiating between blobs that represent real-world objects and non-continuous visual phenomena that could otherwise result in false target detection. When the blob age reaches or exceeds the defined threshold, it can be promoted to a valid target at step 84.

Once a valid target has been detected at step 84, the system adds it to, or updates, the set of previously detected blobs and target features 76 at step 80, and proceeds to perform a size/position comparison at step 86. The size/position comparison step 86 analyzes the target identified at step 84 to determine whether it has recently "merged" with another target, whether it has recently "split" from another target, or whether it has become "obscured" by another target. This determination can be enabled by comparing information about the past positions of a blob relative to other blobs, and allows the overall system to discriminate between targets even if they pass in front of each other from the point of view of a given sensor. In one embodiment of the invention, this feature of the invention can be enhanced using virtual tracks, such as those described in the paper "IST INTERVUSE PROJECT:INTEGRATED RADAR, FLIGHT PLAN AND DIGITAL VIDEO DATA FUSION FOR A-SMGCS", by Pavlidou et al. presented at the ITS in EUROPE Congress, Budapest 2004, May 2004 Merging, splitting and obscuring events detected at step 86 are correlated with relevant targets at step 88, and an updating process is performed at step 80 in order to ensure that the system continues to correctly discriminate between the various previously detected blobs and target features stored at 76. Finally, the system proceeds to the mono-positioning process 90 using the target information obtained from step 88.

Figure 5A:
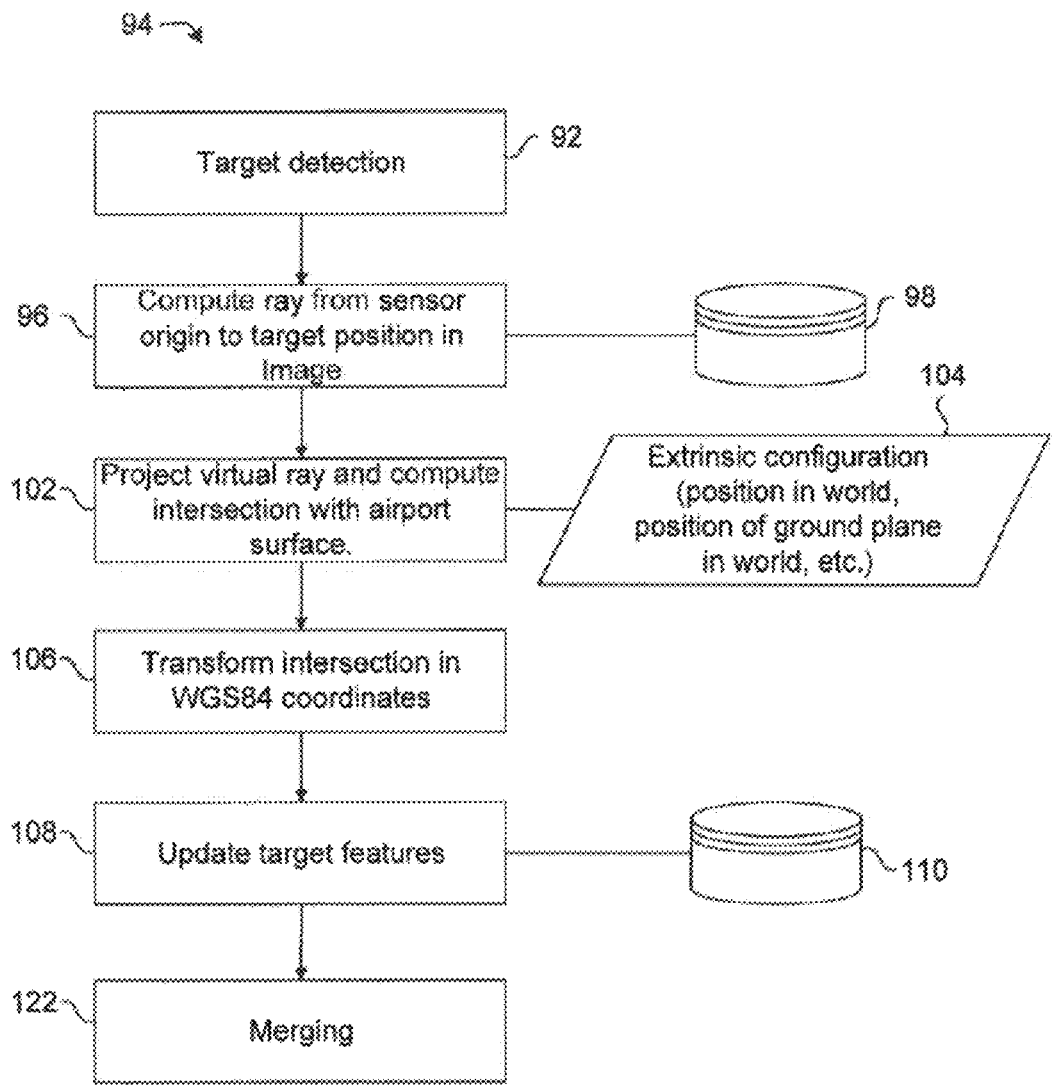
FIG. 5A is a process flow diagram illustrating a mono-positioning method according to an embodiment of the present invention.
Figure 5B:
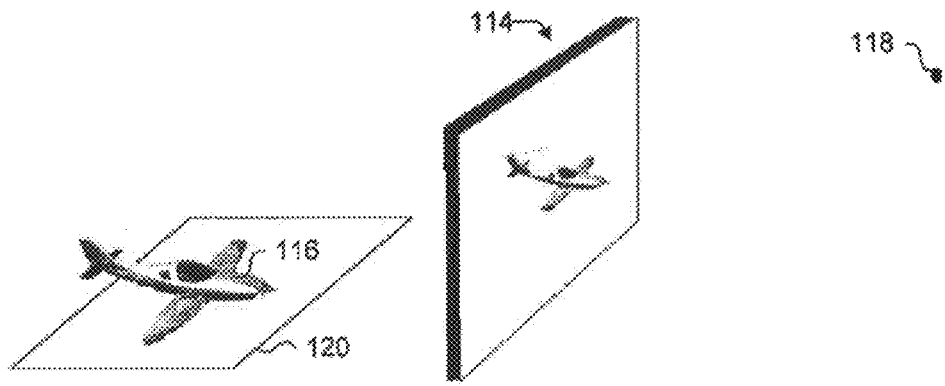
FIG. 5B is a conceptual illustration of an exemplary mono-positioning method according to an embodiment of the present invention.
Figure 5C:
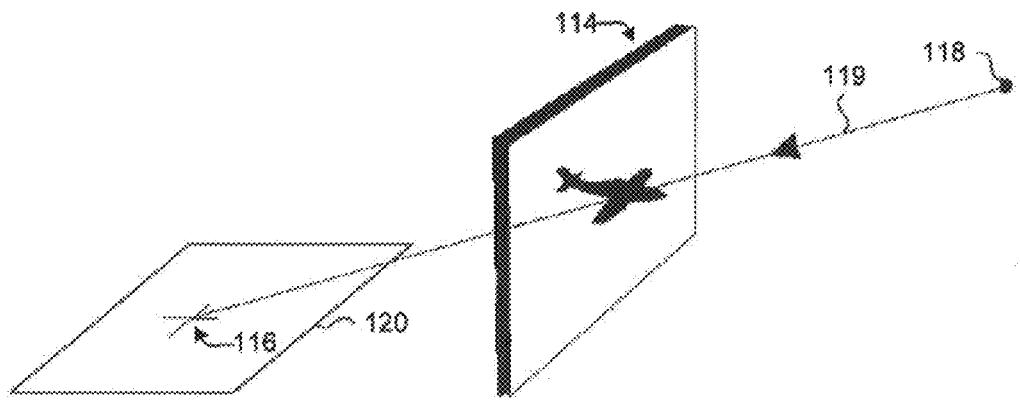
FIG. 5C is a conceptual illustration of the computation used to determine a position in the exemplary illustration of FIG. 5B, according to an embodiment of the present invention.

FIG. 5A is a process flow diagram illustrating a mono-positioning method according to an embodiment of the present invention. This mono-positioning method is a subroutine executed by object processor 13 of FIG. 2, which corresponds to step 94 of FIG. 4B, and is executed for one sensor. It will be convenient to make reference to FIGS. 5B and 5C in describing the process illustrated in FIG. 5A. FIG. 5B is a conceptual illustration of an exemplary mono-positioning method according to an embodiment of the present invention, and FIG. 5C is a conceptual illustration of the computation used to determine a position in the exemplary illustration of FIG. 5B, according to an embodiment of the present invention.

The mono-positioning process 94 according to an embodiment of the present information receives target information 92 from the target detection process described above with reference to FIG. 4A. Target detection information 92 does not provide real-world information since it merely relates to the position of a target within a frame, as represented by the target in scene 114 of FIGS. 5B and 5C. Conceptually, the target in scene 114 information may be used to compute the real-world position of the target 116. As a preliminary step, the optical (intrinsic) configuration of the sensor is taken into account to calculate the trajectory of the ray at step 96 based on calibration, position and other information stored by the system in storage means 98. Such information can further include focal length, distortion coefficients and other parameters native to the specific sensor. If necessary, computations are made to take into account the distortion caused by the shape of the lens of the sensor. Accordingly, a virtual sensor origin 118 is determined from the sensor configuration stored at 98, such as the location of the sensor in a specified geodetic reference frame. More specifically, the virtual sensor origin 118 is constructed in a virtual 3-dimensional (3D) space using known positional details of the camera and the surface being monitored. At step 102, based on the sensor configuration and position, a virtual ray 119 is projected from the sensor origin 118 through the target in scene 114. In particular, the virtual ray 119 is projected through the lowest point of the target in scene 114, which would be the point at which the target touches the ground. It should be noted that the virtual ray 119 is not an electromagnetic beam or light beam that is literally projected, but is a linear vector representing the path of light that is received by the camera, which is represented by the virtual sensor origin 118 in the virtual 3D space. At step 102, the Intersection of the virtual ray 119 with the airport surface plane 120 defined by the system at 104 gives the position of the target 116 expressed in world coordinates, which are then transformed or converted to WGS84 coordinates at step 106. Although the output of positional information with respect to a standard frame of reference like the WGS84 system is desirable in certain embodiments of the invention to facilitate system setup and the merging process of the present invention (described below with reference to FIGS. 6A and 6B), it should be appreciated that it may also be expedient to use a coordinate system that is relative to the airport itself, or any other frame of reference that can be converted into radar-track output that is useful to the controllers who are operating the ground surveillance system.

Since at this stage the detected target is viewed by a single sensor point of view, the lower central part of the target in scene 114 is used to project the ray. It will be appreciated that this is done to minimize the projection error coefficient that could be introduced by the height of the target, although other known computations could be used, depending on the type of error that is to be minimized. It should also be noted that mono-sensor positioned targets always have an elevation that is the same as the airport surface. Any ray 119 intercepting the airport surface behind the sensor point of origin 118 means the detected target has been detected above the horizon line. The embodiments of the Invention are capable of detecting this condition and rejecting objects that are not relevant to surface detection.

In some embodiments of the Invention, such as the example embodiment illustrated in FIG. 5A, the mono-positioning process 94 updates the information that the system stores about the target at step 108 in a features database 110, including, not limited to size, color, intensity, and position. Those of skill in the art will appreciate that any feature that can be extracted from the target in scene 114 can be stored in the features database 110, and subsequently used elsewhere to enhance the performance of processes elsewhere in the system. Target features identified/stored at step 108 are then passed along to the merging process 122. For example, particular colour patterns, logos, serial numbers can be correlated with known information to identify the airline operator, and even flight number.

At this stage, the object processor 13 of FIG. 2 has distinguished a target from background information, and is tracking the target as it moves along the airport surface within the area of coverage. Now that there is sufficient pixel information regarding the valid target, the enhanced image display module can supplement real-time video data with annotations that visually distinguish one target from other identified targets in the frame. As shown in FIG. 1B, an annotation box 6 is shaped based on the smallest dimensioned box that encloses the features of the aircraft, represented as the corresponding pixels in the frame or image. As the aircraft or target moves, the annotation box 0 moves in correspondence. Additional information obtained at step 106 for each target having an unique ID number can be displayed at the same time, to further enhance the Information displayed to the user.

As previously shown, a single sensor can be used to obtain and provide information used by the object processor 13 to identify a target from background information, and for ultimately identifying and tracking a particular target. According to an alternate embodiment, multiple sensors can be used to improve accuracy and redundancy in case of failure of one sensor. When using multiple sensors, each sensor operates under the previously described mono-positioning process, and then additional processing steps are executed to improve accuracy in tracking of the target.

Figure 6A:
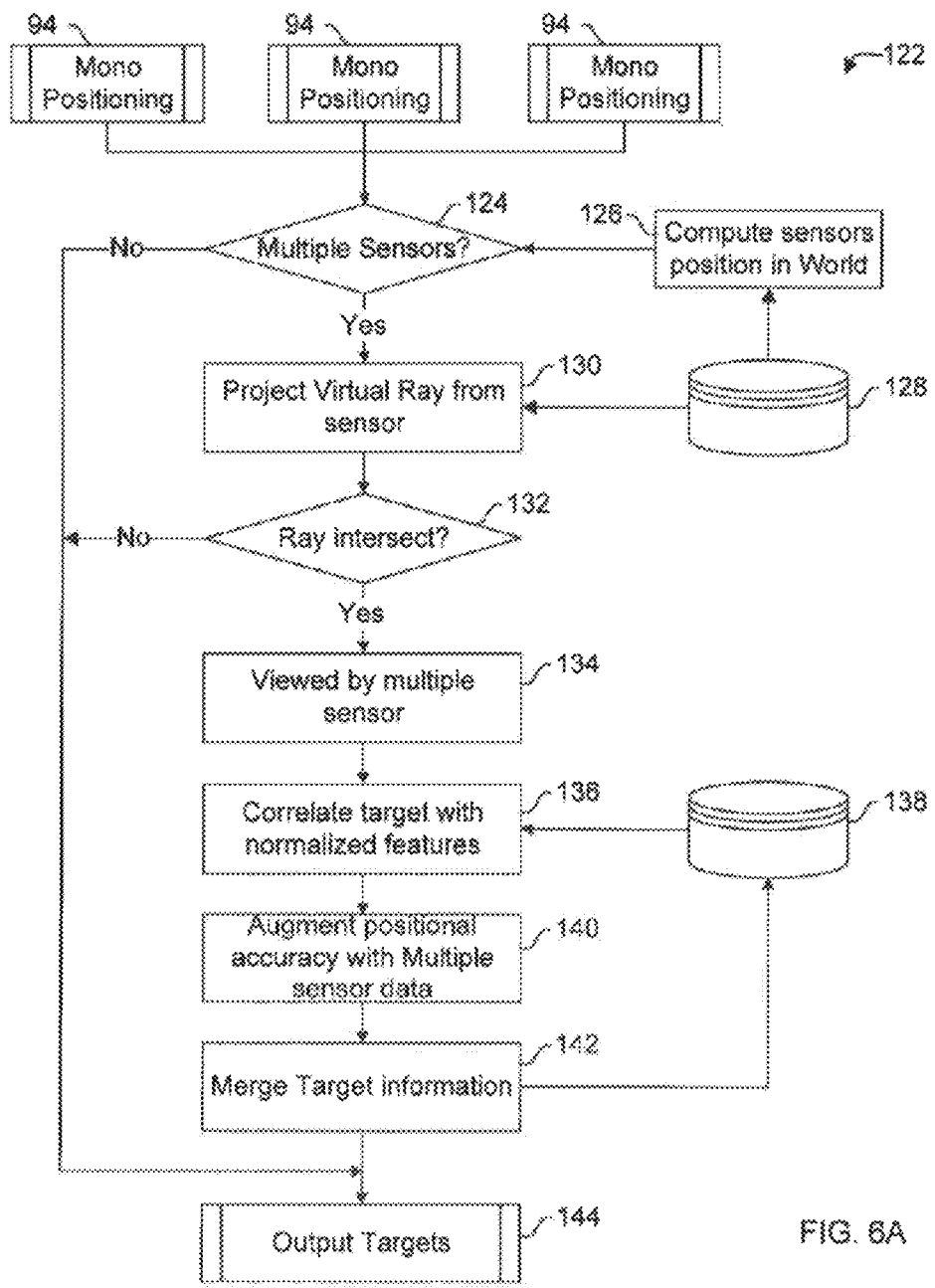
FIG. 6A is a process flow diagram illustrating a merging method according to an embodiment of the present invention.

FIG. 6A is a process flow diagram illustrating a merging method according to an embodiment of the present invention. In describing FIG. 8A, it will be convenient to refer to FIG. 6B, which is a conceptual illustration of an exemplary merging method according to an embodiment of the present invention.

Figure 6B:
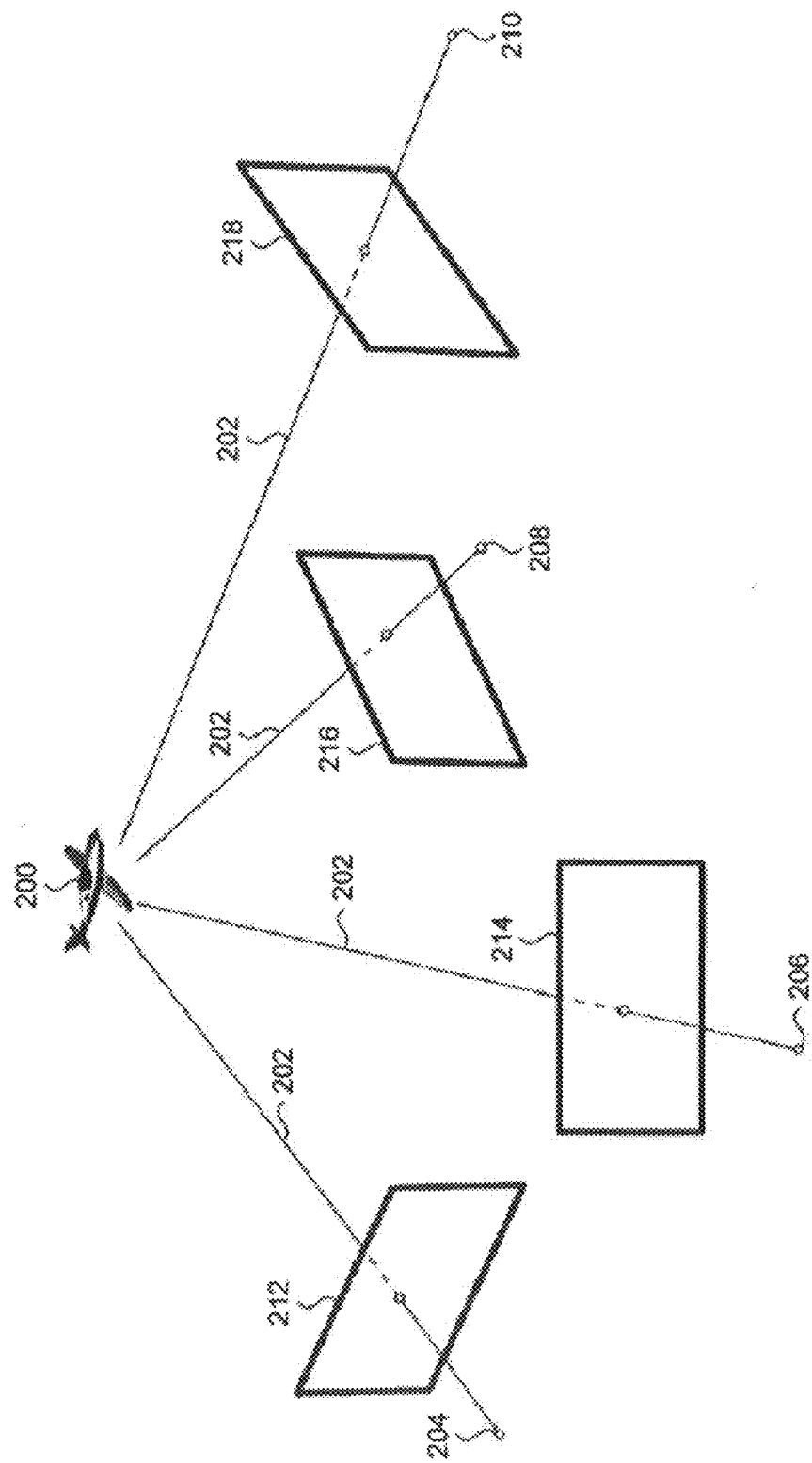
FIG. 6B is a conceptual illustration of an exemplary merging method according to an embodiment of the present invention.

The currently described merging process 122 coordinates the positioning of the target in a common 3-D coordinate system to coherently represent the target hypotheses from multiple mono-positioned objects and compute latitude, longitude and elevation in a WGS84 datum format. Object hypotheses from different sensors are correlated based on features such as color, size and location. Thus, the merging process 122 receives mono positioning data from multiple instances of the mono-positioning process 94 (described above with reference to FIGS. 5A-5C), where each mono-positioning process 94 is executed for one corresponding sensor. At step 124, the system determines whether a given target can be matched with more than one sensor based on the configuration information stored by the system about the position and orientation of all sensors in storage means 128; if a computation at 126 of a given sensor's position in the real world is such that its coverage of that sensor includes the position given by the mono positioning process 94 for a given target, then the determination at step 124 is that multiple sensors cover the target, and the process proceeds to step 130, otherwise the system is satisfied that the best available positioning data is mono-positioning data and proceeds to step 144.

Where multiple sensors, such as four sensors for example, are covering a given target 200 as shown in FIG. 6B, the process proceeds to step 130. It is assumed that positional information for each of the sensors is known. At step 130 multiple virtual rays 202 are ray-projected from virtual sensor virtual sensor origins 204, 206, 208 and 210 established in a virtual 3D space. Each of the virtual sensor origins 204, 206, 208 and 210 correspond to each of the four real sensors, and each respective virtual ray 202 is effectively projected through the central part of the detected object to refine the computed positional accuracy, as illustrated in FIG. 6B. In FIG. 6B, each of the virtual rays 202 passes through the bottom centre portion of the target in corresponding frames 212, 214, 216 and 218, to respective virtual sensor origins 204, 206, 208 and 210. The process next proceeds to step 132, where it is determined whether there is substantial intersection of the virtual rays 202 with each other. Once the vectors of the virtual rays 202 have been calculated, any person skilled in the art will understand that a determination of the intersection of the vectors can be calculated. Substantial intersection takes into account tolerable variance of the 3D position of each ray 202. If there is no substantial intersection, then the system reverts to mono-positioning data and terminates at step 144. There may be circumstances where only some of the rays 202 intersect, which is sufficient for the process to proceed to step 134. Following at step 136 the target is correlated with the normalized features of previously stored target information from all the sensors in storage means 138.

By correlating information between multiple sensors, the process is capable of detecting and filtering out false detections that could be specific to one sensor. For example, a false detection could be introduced by one sensor when an insect or other physical artifact is on the lens. The present embodiment is thus capable of detecting an obstruction on the sensor and correlating the view from one or more other sensors to rule out the false detection. If enough sensors detect the target and it can be correlated with normalized features, the technique fuses the positional accuracy of multiple sensors to generate a more accurate world position expressed in latitude, longitude and elevation at step 140. This information is then merged at step 142 and updated with previously stored target features from all sensors in storage means 138. It should be noted that of the multiple sensors, one may provide information of higher accuracy than the other sensors. For example, a sensor designed for capturing images from short distances is more accurate than a sensor designed for capturing images from longer distances. Hence information provided by the short distance sensor carries a higher weighting, or degree of confidence, when merging the information, and would be relied on to provide a final position. Persons of skill in the art should understand that the weighting factor can be evaluated based on any predetermined criteria. For example, each sensor can be manually assigned a priority level based on its distance from the target area. Alternately, the positions can be averaged if there is insufficient confidence with the Information provided by multiple sensors. This may occur in a situation where the target position is barely within range of the sensor, le, too far away from the sensor. Finally, the merged target information is output at step 142 in a format that will be useful to system operators.

One example primary output is high precision radar-like geodetic coordinates of detected target that can be processed by conventional 2D Radar display. In other words, target data provided in a standardized format can be used by existing systems for displaying the information. Additional examples of outputs that can be provided by the Invention include a processed and stabilized video stream with full target description (position, latitude, longitude, elevation, speed, size, heading, etc.).

Figure 7:
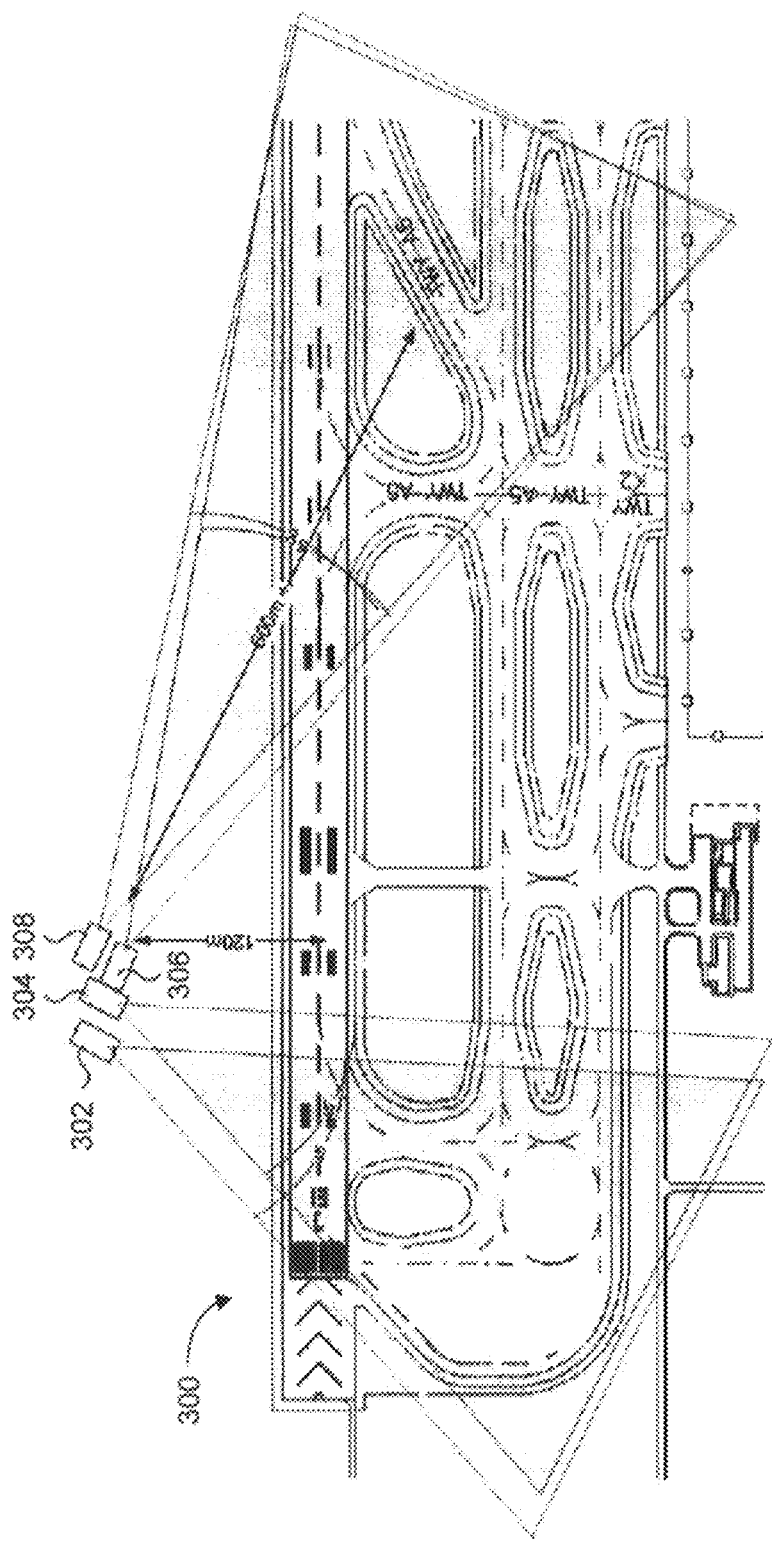
FIG. 7 is an illustration of an example deployment of visual sensors in an airport.

FIG. 7 shows an example deployment where multiple sensors are installed for capturing images of an airport surface. In FIG. 7, the airport surface 300 includes a runway and taxi area, where specific areas are targeted by two pairs of sensors. A first pair of sensors includes sensors 302, 304 and a second pair of sensors includes sensors 306, 308. In the presently shown example, sensors 302 and 304 are both directed to the same area while sensors 306 and 308 are both directed to the same area. In FIG. 7, the overlapping fields of view of each pair of cameras is shown with a grayed area. Therefore if one of the pairs of sensors fails, or does not provide sufficient information for the positive identification of a target via the process of FIG. 2, overall functionality of the system is ensured with the remaining operational sensor. In the present example, the pairs of sensors can be of the same type, or a mix of different types.

Figure 8:
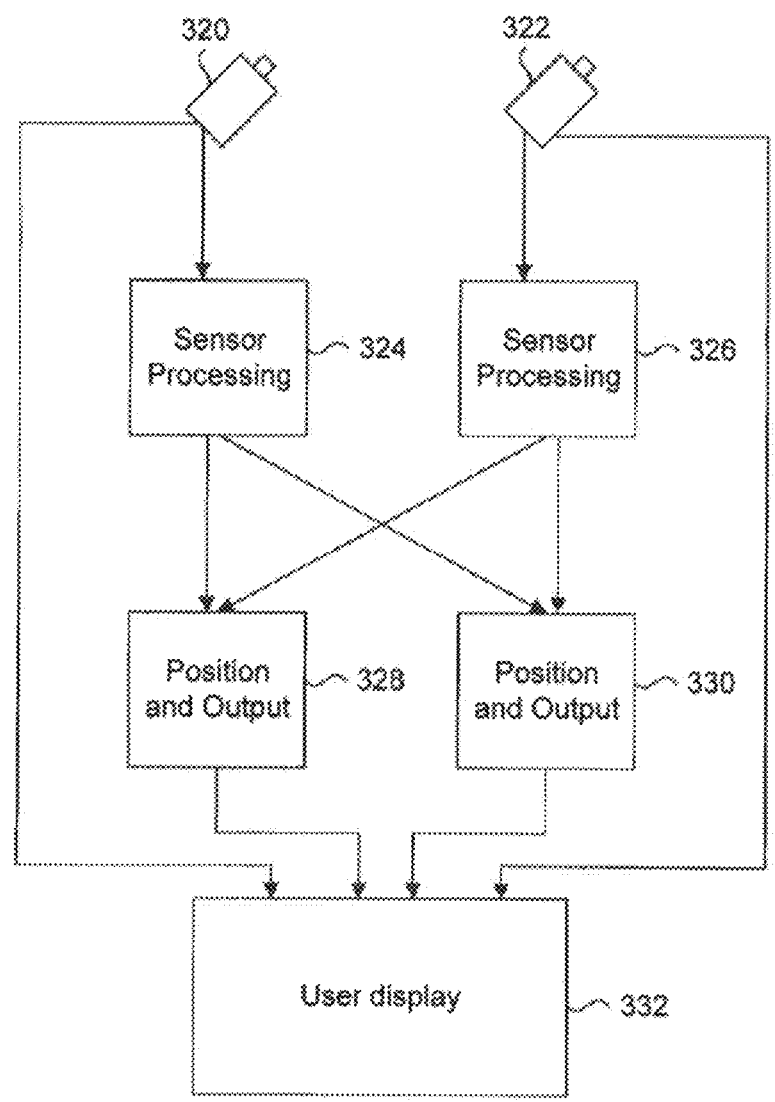
FIG. 8 is a block diagram showing a redundancy technique for the Intelligent video processing system, according to an embodiment of the present invention.

According to an alternate embodiment, the pairs of sensors shown in FIG. 7 are part of a redundancy architecture of the intelligent video processing system. FIG. 8 is a block diagram showing an example architecture of the intelligent video processing system with redundancy. As mentioned above, if one of the pairs of sensors falls or is rendered inoperative, then the other sensor continues to capture images of the selected airport surface area to maintain service. For full redundancy, the computing components of the system are duplicated to ensure complete robustness. As shown in FIG. 8, paired sensors 320 and 322 are each connected to respective sensor processing blocks 324 and 325. Each sensor processing block can include computers for executing the processes of FIG. 3, 4A up to the correlate step 88 of FIG. 4B for example. This computing does not necessarily need to be executed in a dedicated computer, but can be integrated internally within the sensor or in the same module as the sensor. The output of each sensor processing block 324 and 326 is provided to two different position and output blocks 328 and 330 to provide redundant functionality. Each position and output block can include separate computers for executing the processes of FIGS. 5A and 6A for example. Therefore, each position and output block executes processes in parallel for sensor 320 and 322. With the advent of multiple core computer microprocessors, concurrent operations can be executed with minimal impact to overall performance. Since the position and output blocks 328 and 330 output data to display 332, they are typically positioned proximate to display 332. The display 332 can provide the graphical and real-time video images shown in FIG. 1A and FIG. 1B.

Therefore, because each position and output block 328 and 330 processes data from two sensor processing blocks, failure of either blocks 328 or 330 can occur, while data processing using information from both sensors 320 and 322 is maintained. Furthermore, different combinations of a failed sensor processing block (or sensor) and a position and output block does not disable the functionality of this sensor pairing, since the other operational sensor, operational sensor processing block and operational position and output block can provide data to the user display 332. In case of catastrophic failure where all sensor processing blocks 324 and 326 and position and output blocks 328 and 330 are rendered inoperable, both sensors 320 and 322 have direct connections to display 332. Therefore, at least a video display of the real-time images is provided to the users. While the presently shown embodiment shows full redundancy for a two sensor configuration, persons skilled in the art will appreciate that the presently shown redundancy architecture can be scaled for more than two sensors.

The embodiments have been described with reference to the standardized formats ASTERIX and WGS84 for the presentation of Information by example only. Those skilled in the art will understand that other existing standards or future standards can be employed with equal effectiveness.

In the present description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

The invention claimed is:

1. An airport surface surveillance system comprising:
an image acquisition system for capturing frames of digital images of an area of the airport surface mapped to a geodetic reference frame, and for executing a stabilization algorithm to provide corresponding frames of stabilized images, the image acquisition system comprising at least one camera for capturing the frames of digital images;
a target identification system executing a target identification algorithm for identifying pixels in the frames of stabilized images which correspond to a target, the target identification system calculating a position of the target on the airport surface relative to the geodetic reference frame based on positions of the identified pixels within the frames of stabilized images relative to an image reference frame of the frames of stabilized images and a virtual sensor origin of the at least one camera relative to the geodetic reference frame, wherein the image reference frame is different from the geodetic reference frame; and,
a display system for receiving the position of the target and for generating a two-dimensional plan view of the airport surface with an icon representing the position of the target on a visual display.

2. The airport surface surveillance system of claim 1, wherein the image acquisition system includes
a camera array including the at least one camera for capturing the frames of digital images,
an acquisition array for executing the stabilization algorithm upon the frames of digital images to provide the corresponding frames of stabilized images.

3. The airport surface surveillance system of claim 2, wherein the acquisition array statistically compares a new image with a previous image to generate at least one stabilized image corresponding to the new image.

4. The airport surface surveillance system of claim 3, wherein the acquisition array generates a first histogram corresponding to the new image and a second histogram corresponding to the previous image, the acquisition array comparing the first histogram to the second histogram for determining one or more of a translation or rotation of the new image relative to the previous image.

5. The airport surface surveillance system of claim 4, wherein the at least one stabilized image is translated relative to the new image.

6. The airport surface surveillance system of claim 4, wherein the at least one stabilized image is rotated relative to the new image.

7. The airport surface surveillance system of claim 4, wherein the at least one stabilized image is rotated and translated relative to the new image.

8. The airport surface surveillance system of claim 2, wherein the target identification system includes an object processor executing the target identification algorithm for identifying background pixels of the frames of digital images and moving pixels of the frames of digital images corresponding to the target.

9. The airport surface surveillance system of claim 8, wherein the object processor converts the position into WGS84 format and provides ASTERIX formatted data including the WGS84 format position.

10. The airport surface surveillance system of claim 9, wherein the display system provides real-time video output to the visual display.

11. The airport surface surveillance system of claim 10, wherein the display system includes an enhanced image display module for graphically outlining the moving pixels corresponding to the target on the real-time video output appearing on the visual display.

12. The airport surface surveillance system of claim 9, wherein the display system receives the ASTERIX formatted data and displays the icon at a location on the two-dimensional plan view of the airport surface corresponding to the position.

13. A method for tracking a target on an airport surface mapped to a geodetic reference frame, comprising:
capturing raw images of the airport surface using at least one camera;
pre-processing the raw images to correct at least one of translational and rotational deviations relative to a previous image for providing stabilized images;
processing the stabilized images to identify pixels corresponding to the target from background pixels of the stabilized images;
calculating a position of the target on the airport surface relative to the geodetic reference frame based on positions of the identified pixels within the stabilized images relative to an image reference frame of the stabilized images and a virtual sensor origin of the at least one camera relative to the geodetic reference frame, wherein the image reference frame is different from the geodetic reference frame; and, displaying an icon representing the position of the target on a two-dimensional layout of the airport surface on a visual display.

14. The method of claim 13, further including providing real-time video from the stabilized images on the visual display.

15. The method of claim 14, further including graphically outlining the pixels corresponding to the target on the real-time video.

16. The method of claim 13, wherein pre-processing includes
generating a first histogram corresponding to a current raw image,
generating a second histogram corresponding to a previous stabilized image,
comparing the first histogram to the second histogram for determining at least one of the translational and rotational deviations of the current raw image relative to the previous stabilized image, and
performing at least one of translating and rotating of the current raw image by an amount to correct the deviations for providing a stabilized image.

17. The method of claim 13, wherein processing includes
identifying the background pixels of the stabilized images through adaptive background detection to isolate moving object pixels, and
identifying the moving object pixels as pixels corresponding to the target.

18. The method of claim 17, wherein identifying the background includes
comparing a reference background to a movement threshold,
determining if the moving object pixels are moving in substantially the same way at substantially the same time, and,
updating the reference background to include the moving object pixels when the moving object pixels are rejected for failing to move in substantially the same way at substantially the same time.

19. The method of claim 18, wherein identifying the background further includes
extracting shadow pixels corresponding to a shadow of the moving object pixels in response to a shadow threshold, and
updating the reference background to include the shadow pixels.

20. The method of claim 19, wherein identifying the background further includes
determining if the area of the moving object pixels is at least a predetermined minimal size, and
updating the reference background to include the moving object pixels if the area of the moving object pixels is less than the predetermined minimal size.

21. The method of claim 17, wherein identifying the moving object pixels includes
assigning a unique identifier number to the moving object pixels if the moving object pixels fail to correlate with a previously detected object from a previous stabilized image, and
updating previously stored features of the previously detected object with features of the moving object pixels, the features including any one of age, shape, size and position of the moving object pixels.

22. The method of claim 21, wherein identifying the moving object pixels further includes
categorizing the moving object pixels as a target when the age of moving object pixels exceeds a predetermined age threshold, and
discriminating the target from at least one other previously identified target when the moving object pixels merge or split from pixels corresponding to the at least one previously identified target.

* * * * *